US012395095B2

(12) United States Patent
Hartwig et al.

(10) Patent No.: US 12,395,095 B2
(45) Date of Patent: Aug. 19, 2025

(54) COMMUTATION CELL, FLYING CAPACITOR MODULE AND MULTILEVEL CONVERTER

(71) Applicant: Siemens Aktiengesellschaft, Munich (DE)

(72) Inventors: Raphael Hartwig, Freystadt (DE); Alexander Hensler, Gerhardshofen (DE)

(73) Assignee: Siemens Aktiengesellschaft, Munich (DE)

( * ) Notice: Subject to any disclaimer, the term of this patent is extended or adjusted under 35 U.S.C. 154(b) by 212 days.

(21) Appl. No.: 18/274,862

(22) PCT Filed: Dec. 21, 2021

(86) PCT No.: PCT/EP2021/086917
§ 371 (c)(1),
(2) Date: Jul. 28, 2023

(87) PCT Pub. No.: WO2022/161707
PCT Pub. Date: Aug. 4, 2022

(65) Prior Publication Data
US 2024/0113637 A1    Apr. 4, 2024

(30) Foreign Application Priority Data
Jan. 29, 2021 (EP) ..................... 21154385

(51) Int. Cl.
H02M 7/483 (2007.01)
H02M 7/00 (2006.01)
(52) U.S. Cl.
CPC ......... H02M 7/4837 (2021.05); H02M 7/003 (2013.01)
(58) Field of Classification Search
CPC ..................... H02M 7/003; H02M 7/4837
See application file for complete search history.

(56) References Cited

U.S. PATENT DOCUMENTS 8,823,345 B2 * 9/2014 Shtargot .................. H02M 1/44
  327/551
10,924,031 B2 * 2/2021 Li ....................... H02M 7/5387
(Continued)

FOREIGN PATENT DOCUMENTS

DE     102010002627 A1    9/2011

OTHER PUBLICATIONS

Modeer Tomas et al: "Design of a GaN-Based Interleaved Nine-Level Flying Capacitor Multilevel Inverter for Electric Aircraft Applications", IEEE Transactions on Power Electronics, Institute of Electrical and Electronics Engineers, USA, Bd. 35, Nr. 11, Apr. 21, 2020 (Apr. 21, 2020), Seiten 12153-12165, XP011801421, ISSN: 0885-8993, DOI: 10.1109/TPEL.2020.2989329 [found Jul. 28, 2020].
(Continued)

*Primary Examiner* — Jue Zhang
(74) *Attorney, Agent, or Firm* — Henry M. Felerelsen LLC

(57) ABSTRACT

A commutation cell for a flying capacitor module, to a flying capacitor module having the commutation cell and to a multi-level converter having the flying capacitor module is disclosed. The commutation cell includes a circuit board, two semiconductors mounted either on the same side or on opposite sides of the circuit board, four capacitors arranged in pairs on opposite sides of the circuit board, and flying capacitors connected to the input and output sides of the commutation cell, respectively. The capacitors located on opposite sides are connected to one another by way of via holes. Different commutation paths between the various capacitors extend on the first side and on the second side of the circuit board and along the vias, with currents flowing through the respective adjacent capacitors in opposing directions for an overall reduction in the parasitic inductances.

11 Claims, 5 Drawing Sheets

(56) References Cited

U.S. PATENT DOCUMENTS

2011/0216561 A1    9/2011  Bayerer et al.
2021/0013814 A1*   1/2021  Fujita .................... H02M 7/003
2022/0416686 A1*  12/2022  Christen ............... H02M 7/003

OTHER PUBLICATIONS

Barth Christopher B et al: "Design and Control of a GaNBased, 13-Level, Flying Capacitor Multilevel Inverter", IEEE Journal of Emerging and Selected Topics in Power Electronics, IEEE, Piscataway, NJ, USA, Bd. 8, Nr. 3, Nov. 28, 2019 (Nov. 28, 2019), Seiten 2179-2191, XP011801790, ISSN: 2168-6777, DOI: 10.1109/JESTPE. 2019.2956166 [found Jul. 30, 2020].

Pallo Nathan et al: "Modular heat sink for chip-scale GaN transistors in multilevel converters", 2018 IEEE Applied Power Electronics Conference and Exposition (APEC), IEEE, Mar. 4, 2018 (Mar. 4, 2018), Seiten 2798-2805, XP033347633, DOI: 10.1109/APEC. 2018.8341414 [found Apr. 18, 2018].

Chou Derek et al: "An Interleaved 6-Level GaN Bidirectional Converter for Level II Electric Vehicle Charging", 2019 IEEE Applied Power Electronics Conference and Exposition (APEC), IEEE, Mar. 17, 2019 (Mar. 17, 2019), Seiten 594-600, XP033556088, DOI: 10.1109/APEC.2019.8721971 [found May 24, 2019].

PCT International Preliminary Report on Patentability mailed May 3, 2023 corresponding to PCT International Application No. PCT/EP2021/086917 filed Dec. 21, 2021.

* cited by examiner

Commutation Cell

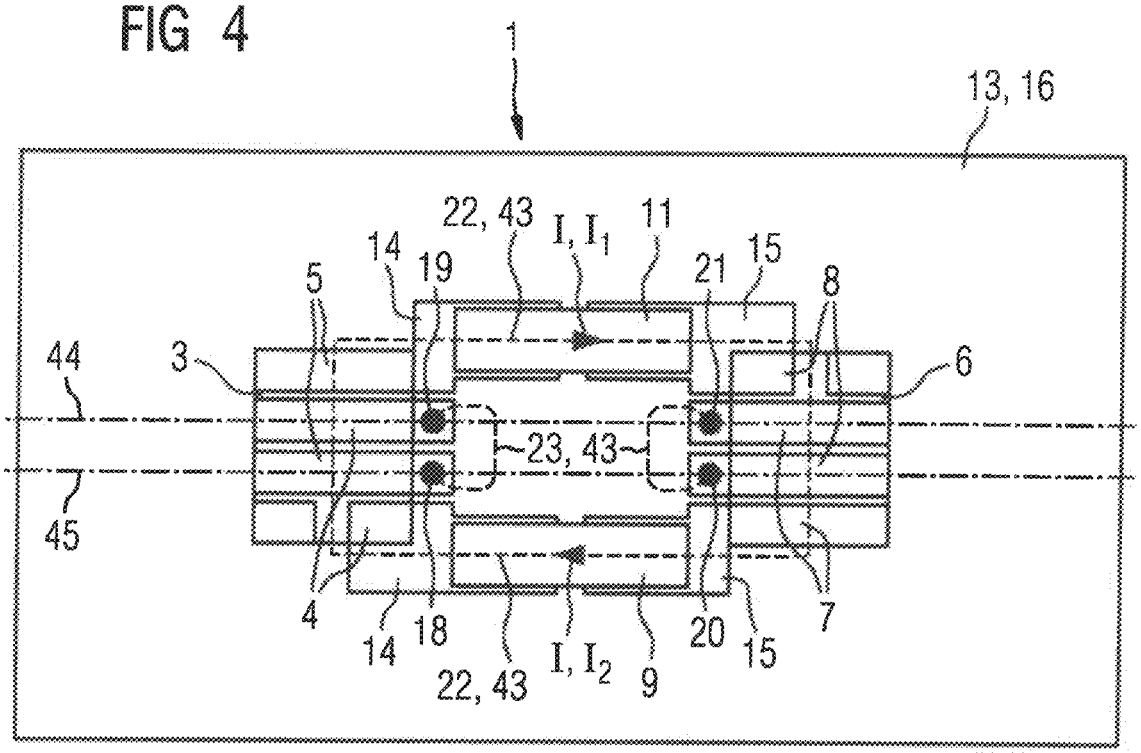
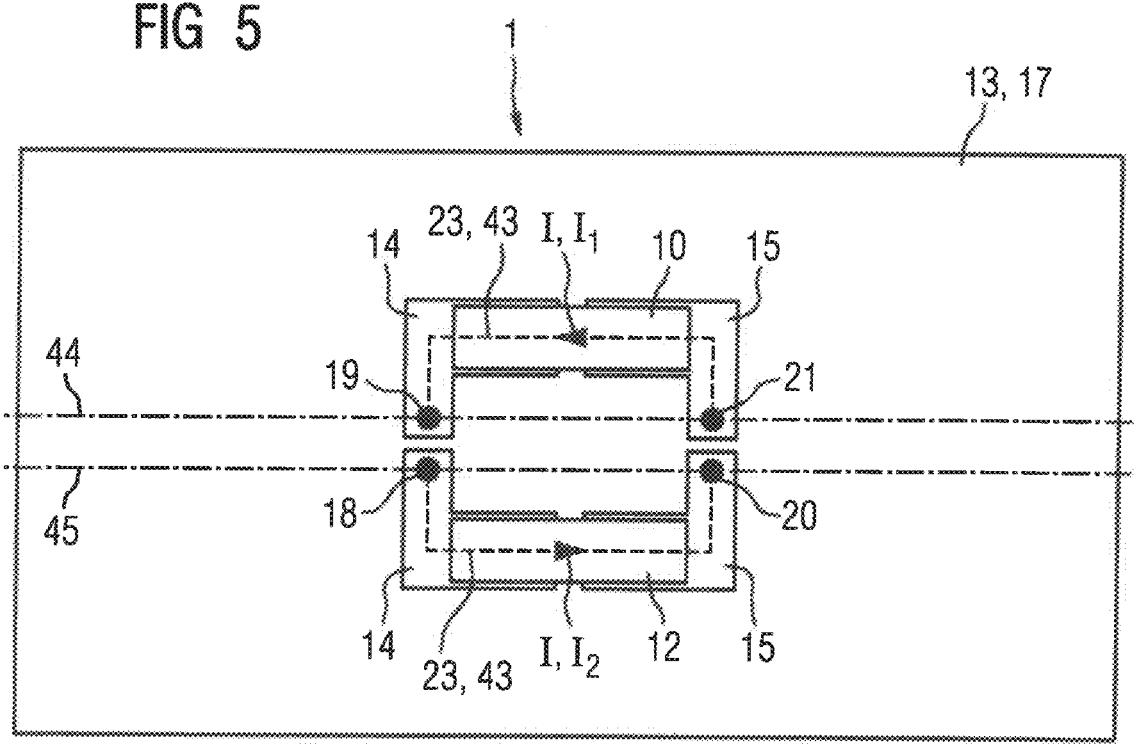

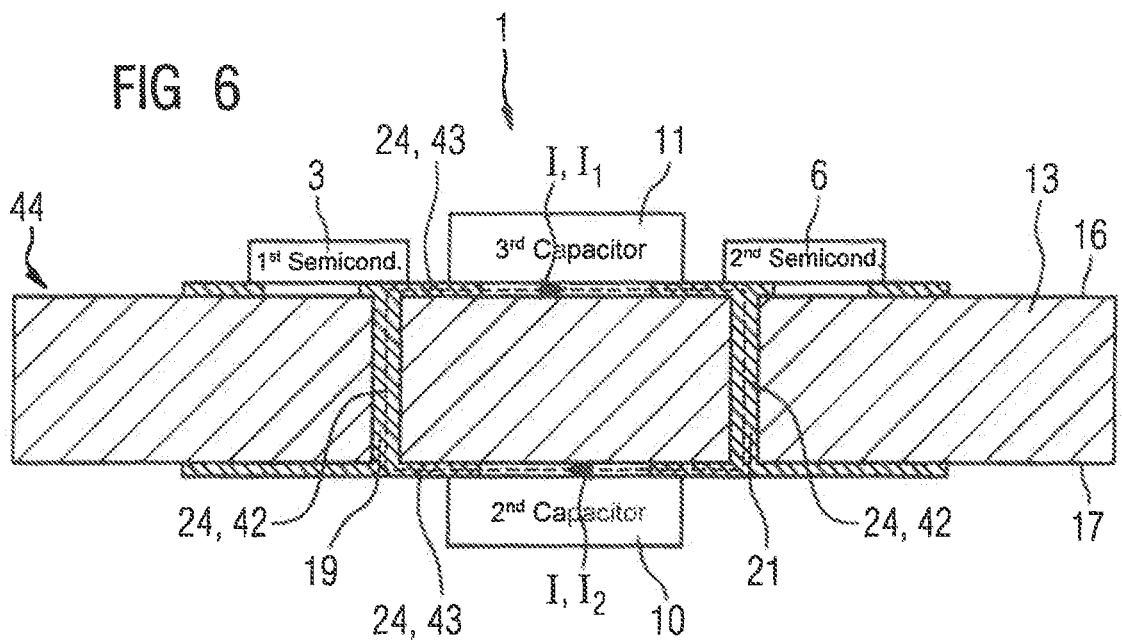
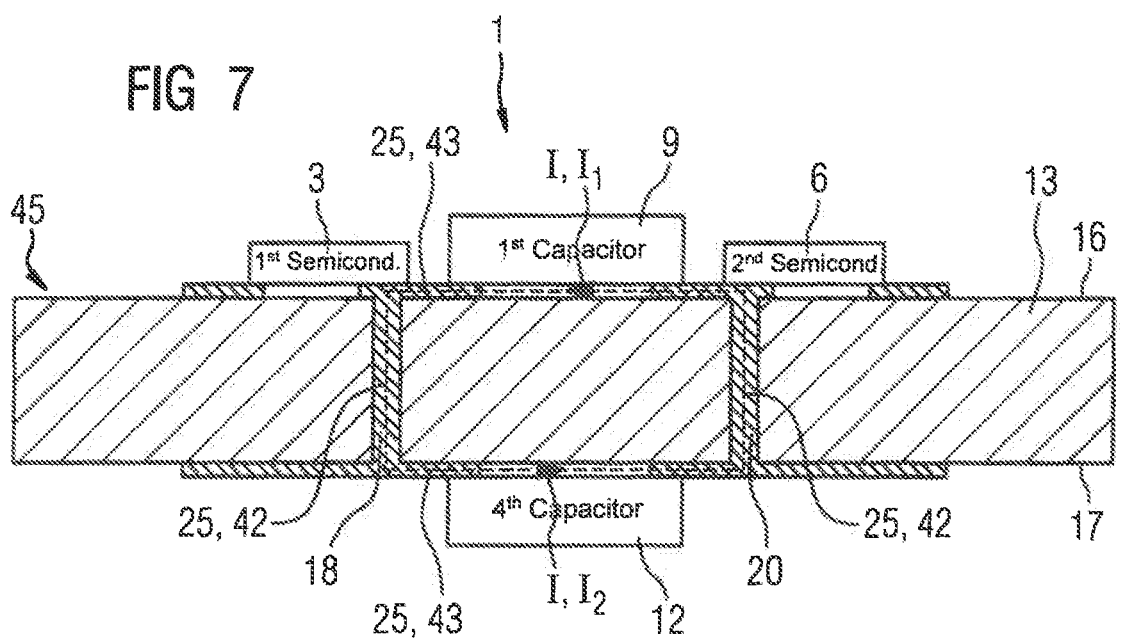

COMMUTATION CELL, FLYING CAPACITOR MODULE AND MULTILEVEL CONVERTER

CROSS-REFERENCES TO RELATED APPLICATIONS

This application is the U.S. National Stage of International Application No. PCT/EP2021/086917 filed Dec. 21, 2021, which designated the United States and has been published as International Publication No. WO 2022/161707 A1 and which claims the priority of European Patent Application, Serial No. 21154385.5, filed Jan. 29, 2021, pursuant to 35 U.S.C. 119 (a)-(d).

BACKGROUND OF THE INVENTION

The invention relates to a commutation cell, a flying capacitor module with the commutation cell and a multilevel converter with the flying capacitor module.

Multilevel converters are used in particular in the industrial setting of drive technology, as well as in the energy supply field whenever there is a demand not only for required high a.c. output voltages for the converters but also for a high quality of sinusoidal a.c. output voltages with low filter complexity.

In particular when using a modular multilevel converter (MMC) with a converter structure formed as a flying capacitor (FC) the limited reverse voltage capacity of commercial semiconductors or power semiconductors is countered, thereby enabling them to be used cost-effectively for converters with the aforementioned requirements. Semiconductors with a high reverse voltage are known to bring about not only high procurement costs and possibly supply problems, but also high forward power losses, meaning that these semiconductors are electrically often inefficient to operate.

Flying capacitor topology therefore has the potential to reduce the overall volume of the components required for the converter and the filter in respect of the aforementioned requirements.

Commutation capacitors, which are also referred to as decoupling capacitors, can, in connection with a commutation path of a commutation cell, assist semiconductors, in particular power semiconductors, in power commutation, in other words the transfer of power, for example from an upper semiconductor switch to a lower semiconductor switch of a bridge arm of a bridge connection in a flying capacitor module of a multilevel converter.

High frequency shares too, as are inherent in the system in the case of flying capacitors, also referred to as intermediate circuit capacitors, should in particular be decoupled by means of the commutation capacitors or decoupling capacitors.

High commutation inductances, as are often allowed for as a result of a somewhat spacious layout in the design for example of conductor paths on a circuit board of the commutation cell or of the commutation path, often generate high switching surges at the semiconductors.

High-power series resistors at the gate of the semiconductors can limit this switching surge. However, as a result the switching losses also increase and it is not possible to make use, or make full use, of the advantages in principle offered by rapid-switching semiconductors, for example for use in converters.

A low-inductance commutation path for the electrical connection of the commutation capacitors to the semiconductors is for this purpose implemented either on one side of the circuit board across its surface, in other words laterally, or through the circuit board, predominantly vertically. The mostly large voltage distances generated in this way or the high circuit board requirement is inadequate to meet the requirements for a low-inductance design of the commutation path or of the commutation cell.

The object of the invention is to provide a commutation cell, a flying capacitor module with the commutation cell and a multilevel converter with the flying capacitor module, which by means of an improved low-inductance structure of the commutation cell compared to the prior art reduces the switching losses occurring between semiconductors in the case of commutation operations.

SUMMARY OF THE INVENTION

The object is achieved by a commutation cell as set forth hereinafter, by a flying capacitor module as set forth hereinafter and by a multilevel converter as set forth hereinafter.

For the achievement of the object a commutation cell for a flying capacitor module is proposed, having a first semiconductor with a first and second terminal and a second semiconductor with a third and fourth terminal, a first, second, third and fourth capacitor and a circuit board, wherein the first semiconductor is connected in a first d.c. voltage phase and the second semiconductor is connected in a second d.c. voltage phase, wherein the first and second capacitor are each connected, in parallel with one another, between the first and third terminal and the third and fourth capacitor are each connected, in parallel with one another, between the second and fourth terminal, wherein the first and third capacitor are arranged on a first side of the circuit board and the second and fourth capacitor are arranged on a second side of the circuit board facing away from the first side, wherein the capacitors on the first side are connected to the capacitors on the second side by means of vias at the terminals and wherein by means of connection and arrangement of the capacitors a first commutation path is formed on the first side and a second, third and fourth commutation path are formed along the vias and on the first and second side.

The design achieved in this way of the capacitor pairs of the capacitor paths, arranged very close together or opposite one another, by means of the lateral commutation across the surfaces, which are made use of only to a limited extent, of the first and second side of the circuit board in combination with a commutation routed through the circuit board enables a very advantageous low-inductance electrical connection of the semiconductors to the capacitors of the commutation path. By means of this structure, the voltage distance across the semiconductors is significantly less than across the capacitors.

Parasitic commutation inductance and associated switching losses can now be significantly reduced.

Advantageous forms of embodiment of the commutation cell are specified in the dependent claims.

In a first advantageous form of embodiment of the commutation cell both the semiconductors are arranged on one of the two sides of the circuit board.

In a further advantageous form of embodiment of the commutation cell the first semiconductor is arranged on the first side and the second semiconductor is arranged on the second side of the circuit board.

Both possibilities for arranging the semiconductors on one of the two sides of the circuit board offer further advantageous possible combinations for connecting the semiconductors to the capacitor pairs of the individual commutation paths.

In a further advantageous form of embodiment of the commutation cell the terminals of both the semiconductors are formed in multiple parts.

Forming terminals in multiple parts, in particular for the drain and source power terminals when using MOSFETs or the collector and emitter power terminals when using IGBTs, advantageously enables easy parallel switching of one or more capacitor pairs.

In a further advantageous form of embodiment of the commutation cell both the semiconductors are GaN semiconductors.

By means of GaN semiconductor switches it is possible to achieve high switching frequencies during switching in comparison for example with semiconductors made of Si. The very low-inductance structure supports this feature, in that it is not necessary to employ powerful series resistors at the gate of the GaN semiconductors in order to have to prevent high switching surges caused by parasitic commutation inductances. High switching surges generally require a decrease in the switching frequency even of GaN semiconductors.

In a further advantageous form of embodiment of the commutation cell the first commutation path has the first and third capacitor, the second commutation path has the second and the fourth capacitor, the third commutation path has the second and the third capacitor and the fourth commutation path has the first and the fourth capacitor as respectively adjacent capacitors for the commutation operations.

The adjacent capacitors are thus in an advantageous manner generally spatially arranged in parallel next to one another. This reduces the line resistance of the adjacent capacitors considerably and helps to reduce the parasitic inductances.

In a further advantageous form of embodiment of the commutation cell the arrangement of the respectively adjacent capacitors of the commutation paths is formed such that during the commutation operations a current flows through the adjacent capacitors in respectively opposing directions.

By means of the opposing directions of the current conduction to and through the respectively adjacent capacitors an advantageous compensation of coupling inductances or parasitic inductances can take place. The reduction in these inductances reduces the switching losses of the semiconductors.

In a further advantageous form of embodiment of the commutation cell, first sections of the commutation paths, which are routed along the vias through the circuit board, are arranged substantially orthogonal to second sections of the commutation paths, which are routed along the first or second side of the circuit board.

The consequent, substantially orthogonal orientation of the vias in respect of the surfaces of both the sides advantageously ensures that the commutation path takes a minimally short route through the circuit board, so that the sections in question can also be formed to be particularly low-inductance.

In a further advantageous form of embodiment of the commutation cell the capacitors are formed as commutation capacitors.

Commutation capacitors often advantageously have a very low inductance, which meets the requirement for an overall reduction in the parasitic inductances in the commutation paths. Furthermore, commutation capacitors have a high peak current capability.

For the achievement of the object a flying capacitor module with an inventive commutation cell is further proposed, wherein a first flying capacitor is connected between the first and the second d.c. voltage phase in parallel with the first and second capacitor at an input side of the commutation cell, wherein a second flying capacitor is connected between the first and the second d.c. voltage phase in parallel with the third and fourth capacitor at an output side of the commutation cell, wherein a third and a fourth semiconductor are connected in series in parallel with the second flying capacitor, facing away from the second flying capacitor and the output side of the commutation cell, between the first and the second d.c. voltage phase and wherein a center tap for a first a.c. voltage phase is formed between the third and fourth semiconductors.

In an advantageous form of embodiment of the flying capacitor module the flying capacitor module has at least one further commutation cell, which is formed as a commutation cell, wherein the further commutation cell is connected in parallel with the first flying capacitor and analogously to the commutation cell at the first and the second d.c. voltage phase, wherein the first flying capacitor is arranged between the further commutation cell and the commutation cell and wherein a further flying capacitor is connected in parallel with and on the input side to the further commutation cell between the first and the second d.c. voltage phase.

For the achievement of the object a multilevel converter with an inventive flying capacitor module is likewise proposed, wherein the d.c. voltage phases of the flying capacitor module are connected to a d.c. voltage intermediate circuit of the multilevel converter, wherein the first a.c. voltage phase can be connected to an a.c. voltage line and wherein the flying capacitor module can be connected by way of the d.c. voltage intermediate circuit and a supply line to a supply grid and by way of the a.c. voltage line to an energy consumer or an energy generator.

In an advantageous form of embodiment of the multilevel converter the multilevel converter has an additional second and third flying capacitor module, each formed as a flying capacitor module, wherein the second and third flying capacitor module are each connected by way of their first and second d.c. voltage phase to the d.c. voltage intermediate circuit of the multilevel converter, wherein the second flying capacitor module has a second a.c. voltage phase and the third flying capacitor module has a third a.c. voltage phase, wherein the second and third a.c. voltage phases can each be connected to the a.c. voltage line and wherein the second and third flying capacitor modules can each be connected by way of the d.c. voltage intermediate circuit and the supply line to the supply grid and by way of the a.c. voltage line to the energy consumer or the energy generator.

BRIEF DESCRIPTION OF THE DRAWING

The above-described properties, features and advantages of this invention and the manner in which they are achieved will become clearer and more readily understandable in connection with the following description of the exemplary embodiments, which are explained in greater detail in connection with the figures, in which:

FIG. 4 shows a schematic partial representation of an inventive commutation cell, FIG. 5 shows a first schematic partial representation of the inventive commutation cell which is supplementary to FIG. 4, FIG. 6 shows a second schematic partial representation of the inventive commutation cell which is supplementary to FIG. 4 and FIG. 5, FIG. 7 shows a third schematic partial representation of the inventive commutation cell which is supplementary to FIG. 4 and FIG. 5, FIG. 1 shows a schematic representation of a circuit of a flying capacitor module 102 with a known commutation cell 101. This flying capacitor module 102 can generate three voltage levels and is hence referred to as a 3-level flying capacitor module 102.

Figure 1:
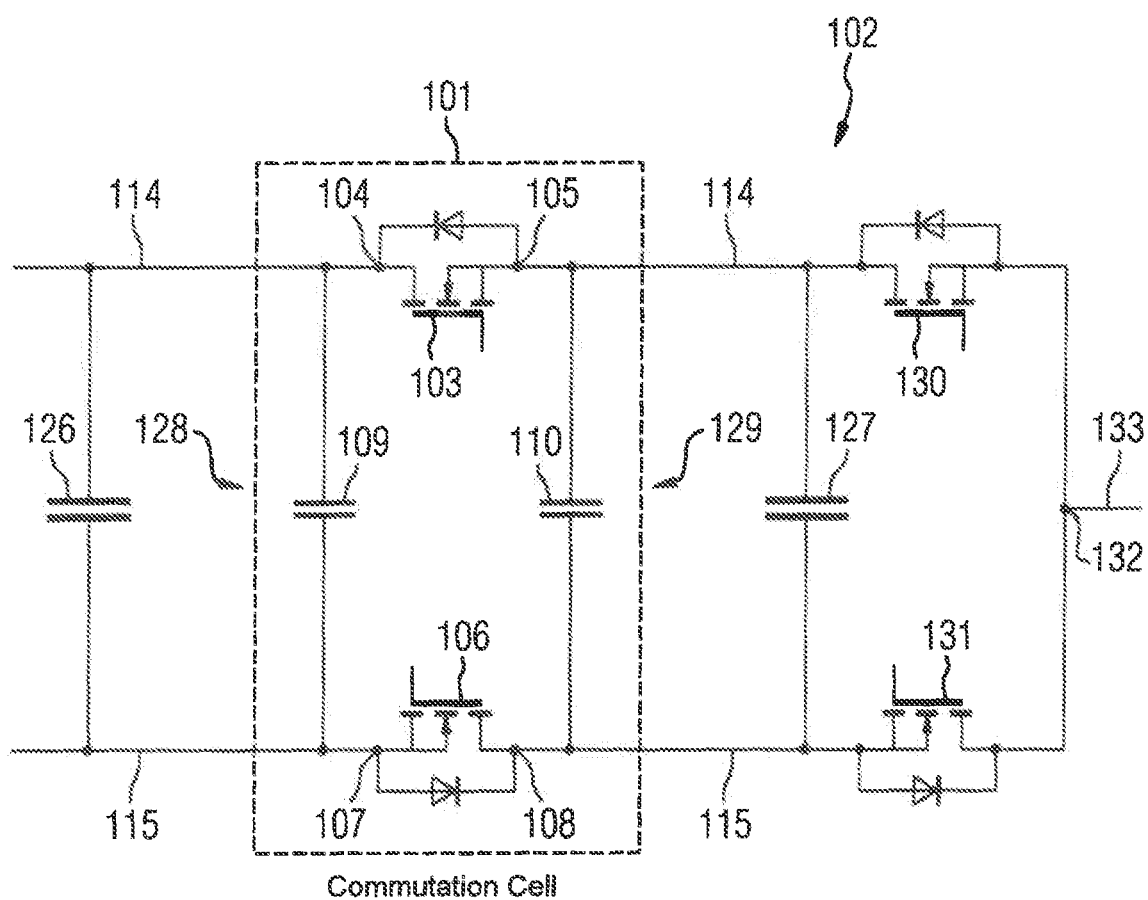
FIG. 1 shows a schematic representation of a circuit of a flying capacitor module with a known commutation cell.

The commutation cell 101 here comprises in the circuit of FIG. 1 a first semiconductor 103 with a first and second terminal 104,105 and a second semiconductor 106 with a third and fourth terminal 107,108. Furthermore, the commutation cell 101 in this circuit also has a first and second capacitor 109,110.

The first semiconductor 103 is connected in a first d.c. voltage phase 114 and the second semiconductor 106 is connected in a second d.c. voltage phase 115.

The first capacitor 109 is connected between the first and third terminal 104,107 and the second capacitor 110 is connected between the second and fourth terminal 105,108.

A first flying capacitor 126 is connected at an input side 128 of the commutation cell 101, and in parallel with the first capacitor 109 of the commutation cell 101, between the first d.c. voltage phase 114 and the second d.c. voltage phase 115.

A second flying capacitor 127 is connected at an output side 129 of the commutation cell 101, and in parallel with the second capacitor 110 of the commutation cell 101, between the first d.c. voltage phase 114 and the second d.c. voltage phase 115.

A third and a fourth semiconductor 130,131 are connected in series in parallel with the second flying capacitor 127, facing away from the output side of the commutation cell 101 and the second flying capacitor 127, between the first and the second d.c. voltage phase 114,115.

A center tap 132 for a connection to a first a.c. voltage phase 133 is formed between the third and fourth semiconductor 130,131.

Figure 2:
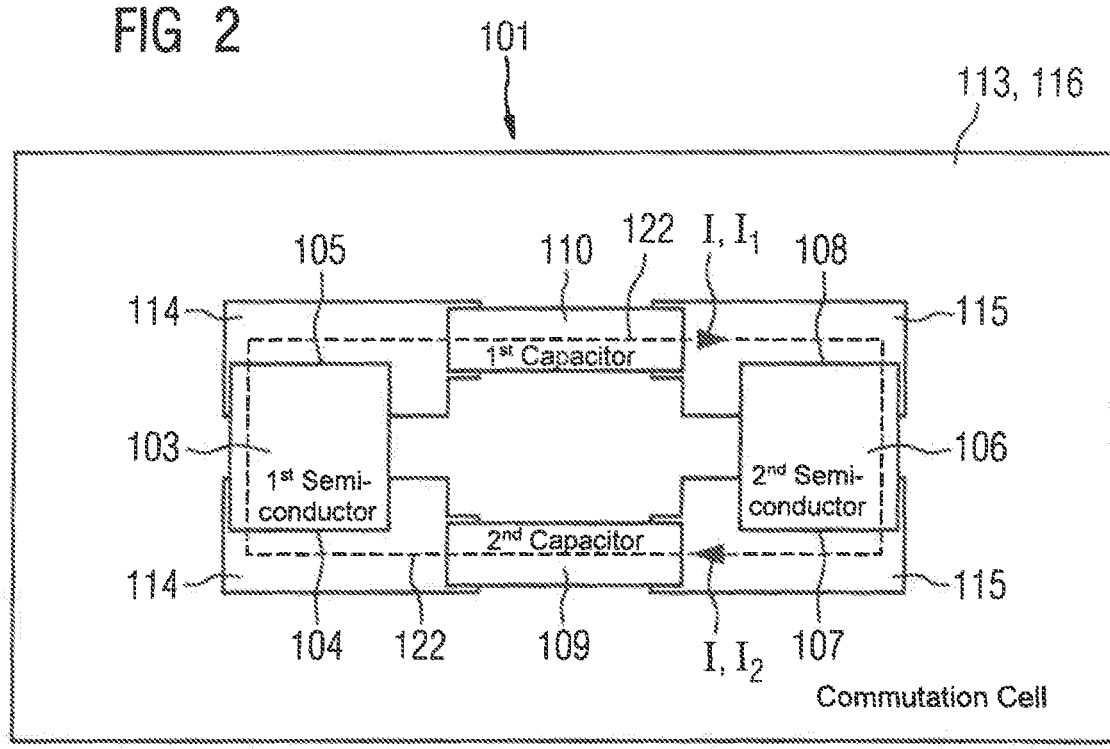
FIG. 2 shows a first schematic representation of the commutation cell in accordance with FIG. 1 with a single commutation path.

FIG. 2 shows a first schematic representation of the commutation cell 101 in accordance with FIG. 1 with a commutation path 122. The connection of the commutation cell 1 to the components shown in FIG. 2, which here are arranged on a first side 116 of a circuit board 113, can be taken analogously from FIG. 1.

The commutation path 122 is formed laterally along the first side 116 of the circuit board 113 and additionally shows two opposing directions $I_1, I_2$ of a current I flowing along the commutation path 122.

Figure 3:
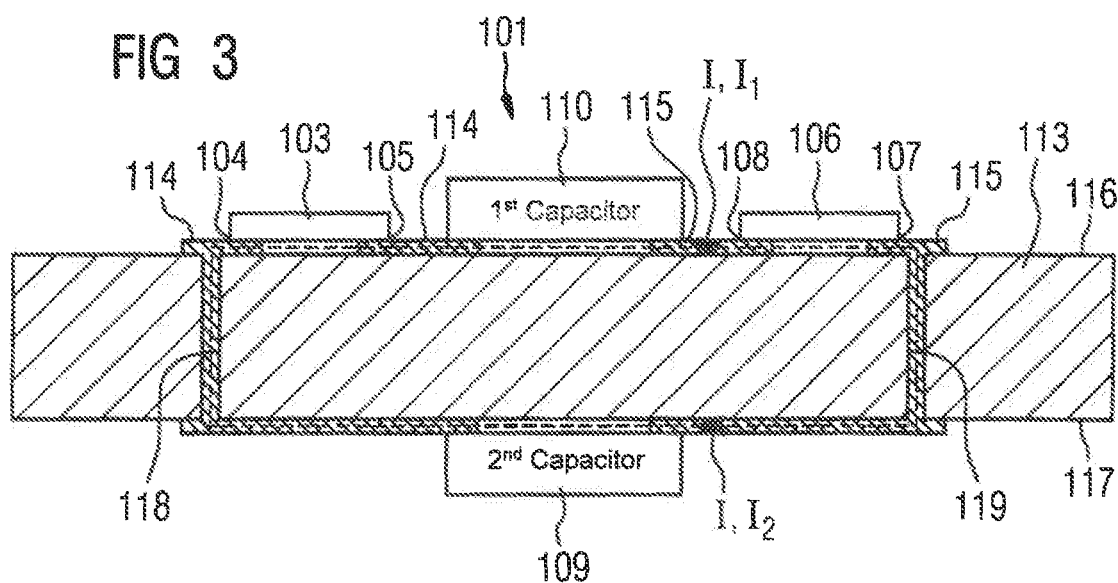
FIG. 3 shows a second schematic representation of the commutation cell in accordance with FIG. 1 with a further single commutation path.

FIG. 3 discloses a second schematic representation of the commutation cell in accordance with FIG. 1 with a further commutation path 123. The connection of the commutation cell 1 to the components shown in FIG. 3, which here are arranged on a first and second side 116,117 of a circuit board 113, can be taken analogously from FIG. 1.

The first and the second semiconductor 103,105 and the second capacitor 110 are here arranged in the exemplary embodiment on the first side 116 of the circuit board 113. The first capacitor 109 is arranged on a second side 117 of the circuit board 113. The connection of the components takes place by way of a first and a second via 118,119.

The commutation path 123 is formed laterally along the first and the second side 116,117 of the circuit board 113 and orthogonally thereto by way of the first and the second via 118,119 and additionally shows two opposing directions $I_1, I_2$ of a current I flowing along the commutation path 123.

FIG. 4 shows a schematic partial representation of an inventive commutation cell 1.

The overall representation of the inventive commutation cell 1 comprises FIGS. 4 to 7. The schematic of the commutation cell 1 for FIGS. 4 to 7 can be taken from FIG. 8.

A first and a second semiconductor 3,6 and a first and a third capacitor 9,11 are arranged and electrically connected on a first side 16 of a circuit board 13.

The first semiconductor 3 is connected in the first d.c. voltage phase 14 and the second semiconductor 6 is connected in the second d.c. voltage phase 15. The first capacitor 9 is connected between the first terminal 4 of the first semiconductor 3 and the third terminal 7 of the second semiconductor 6. The third capacitor 11 is connected between the second terminal 5 of the first semiconductor 3 and the fourth terminal 8 of the second semiconductor 6.

A first commutation path 24 is formed in FIG. 4 with its second sections 43 fully laterally along the first side 16 of the circuit board 13 and in the first commutation path 22 additionally shows two opposing directions $I_1, I_2$ of the current I flowing in the capacitors 9,11.

A second commutation path 23 is formed in FIG. 4 with its second sections 43 at least partially laterally along the first side 16 of the circuit board 13. The second commutation path 23 is routed on a second side of the circuit board 13 facing away from the first side 16 of the circuit board 13 (not shown in FIG. 4) by way of vias 18,19,20,21, which can be taken from FIG. 5.

FIG. 5 discloses a first schematic partial representation of the inventive commutation cell 1 supplementary to FIG. 4.

FIG. 5 shows the second side 17 of the circuit board 13, which corresponds to the circuit board 13 shown in FIG. 4. FIG. 5 should in this case be viewed from the same perspective (from above) as FIG. 4, as if the circuit board 13 were transparent.

A second capacitor 10 and a fourth capacitor 12 are electrically connected to the components arranged on the first side 16 of the circuit board 13 by way of the vias 18,19,20,21.

In this case the second and fourth capacitor 10,12 are connected in parallel between the first d.c. voltage phase 14 and the second d.c. voltage phase 15.

The second commutation path 23 is formed in FIG. 5 with its second sections 43 laterally along the second side 17 of the circuit board 13 and in the second commutation path 23 additionally shows two opposing directions $I_1, I_2$ of the current I flowing in the capacitors 10,12.

The second commutation path 23 is routed onto the first side 16 of the circuit board 13 (not shown in FIG. 4) by way of the vias 18,19,20,21, which can be taken from FIG. 4.

FIGS. 4 and 5 each show a first and a second line of intersection 44,45, wherein the first line of intersection 44 corresponds to a sectional view in FIG. 6 and the second line of intersection 45 corresponds to a sectional view in FIG. 7.

FIG. 6 shows a second schematic partial representation of the inventive commutation cell 1 which is supplementary to FIG. 4 and FIG. 5.

FIG. 6 corresponds to a sectional view at the first line of intersection 44 from FIG. 4 and FIG. 5.

Figure 8:
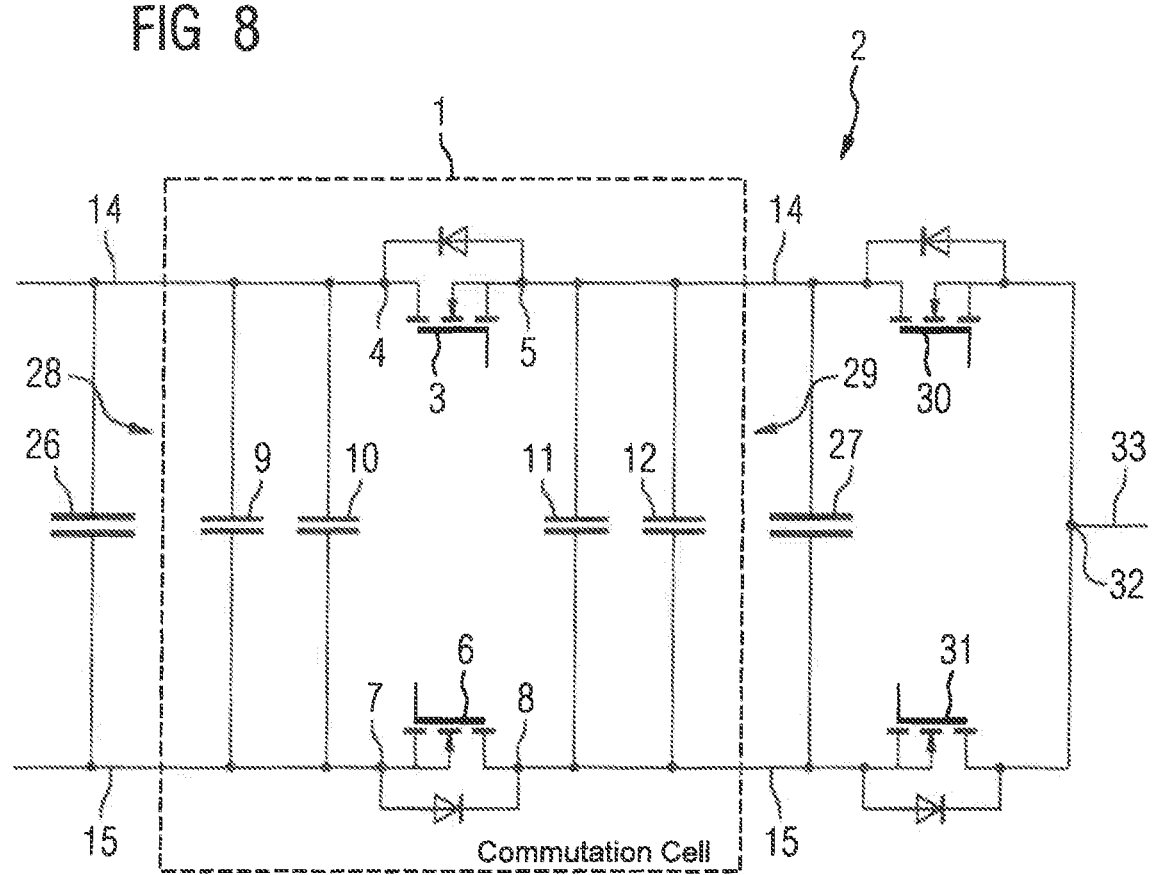
FIG. 8 shows a schematic representation of a circuit of an inventive flying capacitor module with the inventive commutation cell in accordance with FIG. 4 to FIG. 7.

The electrical connection of both the semiconductors 3 and 6 and of both the capacitors 10,11 can also be taken from the circuit shown in FIG. 8.

Only the second capacitor 10 is arranged on the second side 17 of the circuit board 13.

In FIG. 6 a third commutation path 24 can be seen, which runs through the vias 19,21, both the semiconductors 3,6 and the second and the third capacitor 10,11.

The third commutation path 24 is formed with its second sections 43 laterally along the first and second side 16,17 of the circuit board 13 but is also formed orthogonally with its first sections 42 by means of the vias 19,21 through the circuit board 13. In addition, the third commutation path 24 shows two opposing directions $I_1, I_2$ of the current I flowing in the capacitors 10,11.

FIG. 7 shows a third schematic partial representation of the inventive commutation cell which is supplementary to FIG. 4 and FIG. 5.

FIG. 7 corresponds to a sectional view at the second line of intersection 45 from FIG. 4 and FIG. 5.

The electrical connection of both the semiconductors 3 and 6 and of both the capacitors 9 and 10 can also be taken from the circuit shown in FIG. 8.

FIG. 7 shows a fourth commutation path 25, which runs through the vias 18,20, both the semiconductors 3,6 and the first and fourth capacitor 9,12.

Only the fourth capacitor 12 is arranged on the second side 17 of the circuit board 13.

The fourth commutation path 25 is formed with its second sections 43 laterally along the first and second side 16,17 of the circuit board 13 but is also formed orthogonally with its first sections 42 by means of the vias 18,20 through the circuit board 13. In addition, the fourth commutation path 25 shows two opposing directions $I_1, I_2$ of the current I flowing in the capacitors 9,12.

FIG. 8 shows a schematic representation of a circuit of an inventive flying capacitor module 2 with the inventive commutation cell 1 in accordance with FIG. 4 to FIG. 7.

The commutation cell 101 here comprises in the circuit of FIG. 8 a first semiconductor 3 with a first and second terminal 4,5 and a second semiconductor 6 with a third and fourth terminal 7,8. Furthermore, the commutation cell 101 in this circuit also has a first, second, third and fourth capacitor 9,10,11,12.

The first semiconductor 3 is connected in a first d.c. voltage phase 14 and the second semiconductor 6 is connected in a second d.c. voltage phase 15.

The first and the second capacitor 9,10 are connected to one another in parallel between the first and third terminal 4,7 and the third and fourth capacitor 11,12 are connected to one another in parallel between the second and fourth terminal 5,8.

A first flying capacitor 26 is connected at an input side 28 of the commutation cell 1, and in parallel with the first capacitor 9 of the commutation cell 1 between the first d.c. voltage phase 14 and the second d.c. voltage phase 15.

A second flying capacitor 27 is connected at an output side 29 of the commutation cell 1, and in parallel with the fourth capacitor 12 of the commutation cell 1 between the first d.c. voltage phase 14 and the second d.c. voltage phase 15.

A third and a fourth semiconductor 30,31 are connected in series in parallel with the second flying capacitor 27, facing away from the output side of the commutation cell 1 and the second flying capacitor 27 between the first and the second d.c. voltage phase 14,15.

A center tap 32 for a connection to a first a.c. voltage phase 33 is formed between the third and fourth semiconductor 30,31.

Figure 9:
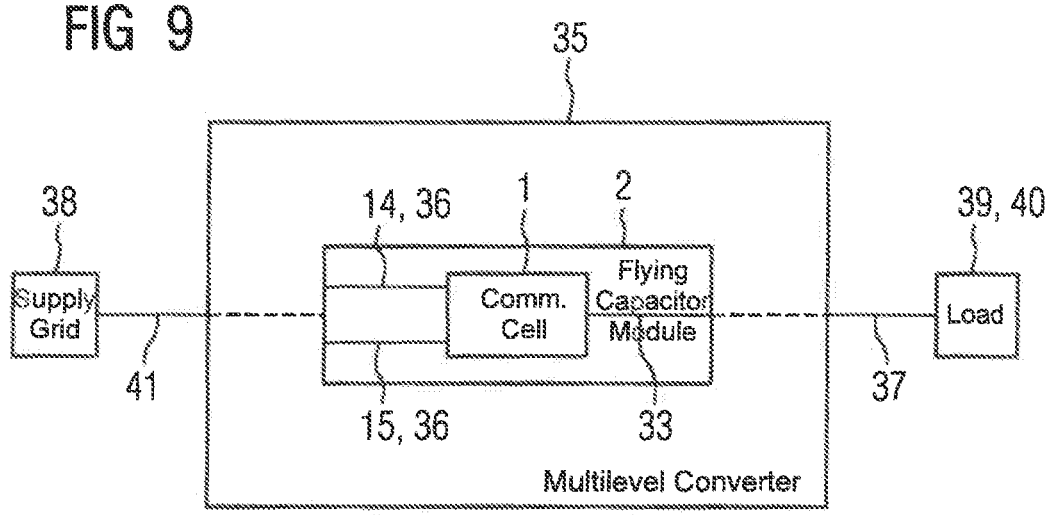
FIG. 9 shows a schematic representation of an inventive multilevel converter with an inventive flying capacitor module and the inventive commutation cell of the flying capacitor module for operation of an energy generator or energy consumer by means of the multilevel converter on a supply grid. DETAILED DESCRIPTION OF PREFERRED EMBODIMENTS

FIG. 9 discloses a schematic representation of an inventive multilevel converter 35 with an inventive flying capacitor module 2 and the inventive commutation cell 1 of the flying capacitor module 2 for operation of an energy consumer 39 or energy generator 40 by means of the multilevel converter 35 at a supply grid 38.

In this exemplary embodiment the multilevel converter 35 has a flying capacitor module 2 for single-phase operation, wherein the flying capacitor module 2 has at least one commutation cell 1, as is required for example for 3-level operation. The commutation cell 1 is connected to the d.c. voltage intermediate circuit 36 at or in the flying capacitor module 2 by way of the first and the second d.c. voltage phase 14,15.

Whether a d.c. voltage is provided by the supply grid 38 by way of the supply line 41 to the multilevel converter 35 and accordingly also to the flying capacitor module 2, which ideally can be fed into the d.c. voltage intermediate circuit 35 without conversion, or whether the electrical energy first has to be converted from an a.c. voltage from the supply grid 38 to a d.c. voltage for the d.c. voltage intermediate circuit, is left open here. Both are possible.

The energy consumer 39 or the energy generator 40 can be operated at the supply grid 38 by way of an a.c. voltage phase 33 of the flying capacitor module 2, which has the commutation cell 1, by means of the a.c. voltage line 37 connected to the multilevel converter 35 and the flying capacitor module 2.

The invention claimed is:

1. A commutation cell for a flying capacitor module, the commutation cell comprising:
   a circuit board having a first side and an opposite second side;
   a first semiconductor comprising a first terminal connected to a first d.c. voltage phase and a second terminal;
   a second semiconductor comprising a third terminal connected to a second d.c. voltage phase and fourth terminal;
   a first capacitor and a second capacitor formed as low-inductance commutation capacitors and connected in parallel between the first and third terminal;
   a third capacitor and a fourth capacitor formed as low-inductance commutation capacitors and connected in parallel between the second and fourth terminal,
   wherein for an overall reduction in the parasitic inductances
   the second and fourth capacitors are arranged on the first side and the first and third capacitors are arranged on the second side of the circuit board, with the first and third capacitors being connected to the second and fourth capacitors at the terminals by vias, the first and third capacitors form a first commutation path on the first side, the second and the fourth capacitors form a second commutation path on the second side, the second and the third capacitors form a third commutation path and the first and the fourth capacitors form a fourth commutation path, with the third and fourth commutation paths being formed along the vias and on the first and second sides; and the commutation cell further comprising a first flying capacitor connected between the first d.c. voltage phase and the second d.c. voltage phase in parallel with the first and second capacitors on an input side of the commutation cell; and a second flying capacitor connected between the first d.c. voltage phase and the second d.c. voltage phase in parallel with the third and fourth capacitor on an output side of the commutation cell.

2. The commutation cell of claim 1, wherein the first semiconductor and the second semiconductor are arranged on one of the first side or the second side of the circuit board.

3. The commutation cell of claim 1, wherein the first semiconductor is arranged on the first side of the circuit board and the second semiconductor is arranged on the second side of the circuit board.

4. The commutation cell of claim 1, wherein the first, second, third and fourth terminals are formed as multiple parts.

5. The commutation cell of claim 1, wherein both the first semiconductor and the second semiconductor are GaN semiconductors.

6. The commutation cell of claim 1, wherein during a commutation operation, a current flows through the first capacitor and the third capacitor along the first commutation path in a first direction, and the current flows through the second capacitor and the fourth capacitor along the second commutation path in a second direction opposite the first direction.

7. The commutation cell of claim 1, wherein first sections of the third and fourth commutation paths that extend through the vias are arranged orthogonally to second sections of the first and second commutation paths that are routed along the first side or the second side of the circuit board.

8. A flying capacitor module, comprising:

a commutation cell as set forth on claim 1; and a third semiconductor connected in series with a fourth semiconductor at a center tap forming a first a.c. voltage phase with a serial connection connected between the first d.c. voltage phase and the second d.c. voltage phase in parallel with the second flying capacitor facing away from the second flying capacitor and from the output side of the commutation cell.

9. The flying capacitor module of claim 8, further comprising:

a further said commutation cell, said further commutation cell being connected in parallel with the first flying capacitor at the first d.c. voltage phase and the second d.c. voltage phase, with the first flying capacitor is arranged between the further commutation cell and the commutation cell, and a further flying capacitor connected in parallel with and on the input side to the further commutation cell between the first d.c. voltage phase and the second d.c. voltage phase.

10. A multilevel converter, comprising a flying capacitor module as set forth in claim 8, wherein the first and second d.c. voltage phases of the flying capacitor module are connected to a d.c. voltage intermediate circuit of the multilevel converter, said flying capacitor module being connected via a supply line to a supply grid by way of the d.c. voltage intermediate circuit, wherein a first a.c. voltage phase is connected via an a.c. voltage line to an energy consumer or to an energy generator.

11. The multilevel converter of claim 10, further comprising additional second and third flying capacitor modules, each constructed as a flying capacitor module as set forth in claim 8, wherein the additional second and third flying capacitor modules are each connected to the d.c. voltage Intermediate circuit by way of their respective first and second d.c. voltage phases, said additional second flying capacitor module having a second a.c. voltage phase and said additional third flying capacitor module having a third a.c. voltage phase, wherein the second and third a.c. voltage phases are each connected to the a.c. voltage line, and wherein the additional second and third flying capacitor modules are each connected to the supply grid by way of the d.c. voltage intermediate circuit and the supply line and to the energy consumer or the energy generator by way of the a.c. voltage line.

* * * * *